Oct. 23, 1962        H. C. OPPEL        3,059,399

SUGAR BEET TOPPERS

Filed Oct. 1, 1959        3 Sheets-Sheet 1

INVENTOR.

Heinz Carl Oppel

INVENTOR.
Heinz Carl Oppel

Oct. 23, 1962 H. C. OPPEL 3,059,399
SUGAR BEET TOPPERS
Filed Oct. 1, 1959 3 Sheets-Sheet 3
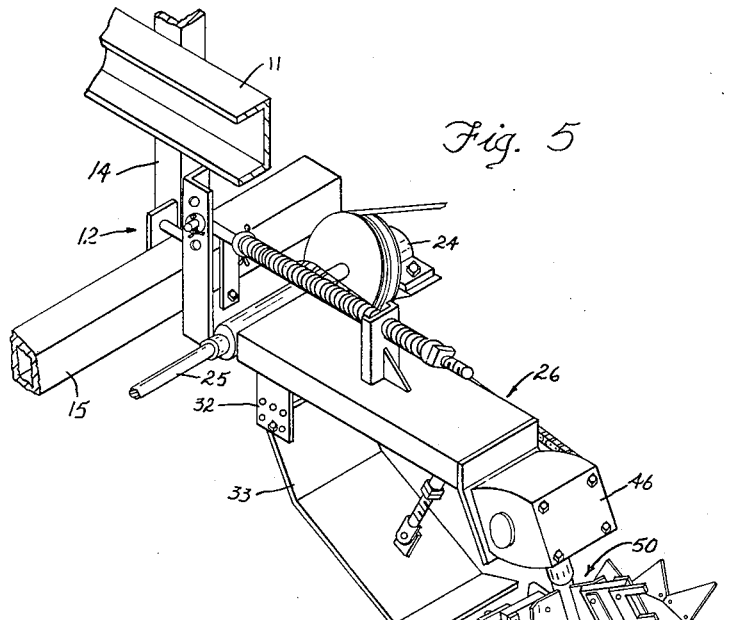
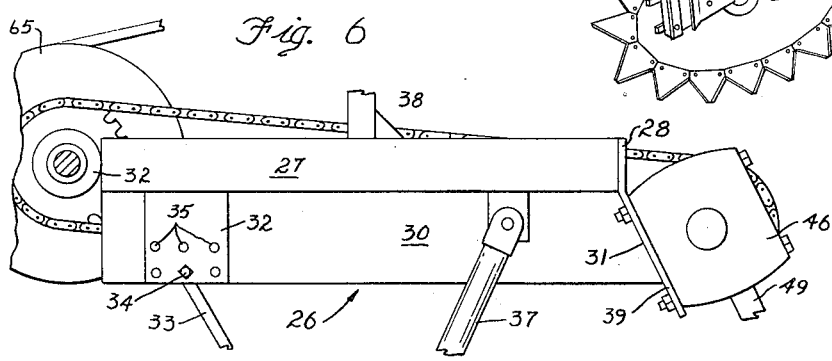
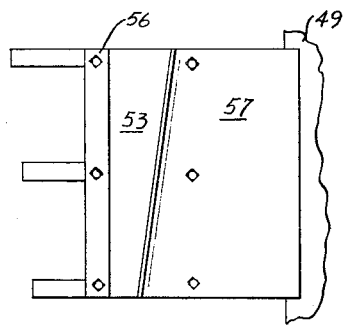
INVENTOR.
Heinz Carl Oppel

United States Patent Office 3,059,399
Patented Oct. 23, 1962

3,059,399
SUGAR BEET TOPPERS
Heinz Carl Oppel, 212 S. 5th St., Boise, Idaho
Filed Oct. 1, 1959, Ser. No. 843,706
2 Claims. (Cl. 56—121.46)

This invention relates to a novel sugar beet topper for use in conjunction with a sugar beet picker to remove the tops from sugar beets in preparation for harvesting. The tops of the beets are easily cut in the field by the disclosed device while still in the ground.

It is an object of this invention to provide a topper which will automatically follow the contour of the beet tops and which may be readily mounted upon a harvester or other mobile unit such as a conventional tractor normally used in picking sugar beets.

It is a further object of this invention to facilitate further harvesting steps by flinging the cut tops to one side of the multiple rows being cut.

It is a further object of this invention to provide counterbalancing and shock-absorber means to compensate sudden shocks due to uneven contours in the crop rows.

These objects are accomplished by use of a plurality of tilted rotary cutters mounted below the mobile unit on a pivoted support. Each cutter is provided with fingers which fling the cut tops to an adjacent cutter and on to the side of the mobile unit. A more complete understanding of this invention may be obtained from the following detailed description and the accompanying drawings. It is to be understood that this invention is not to be limited in scope to the exact embodiment used for illustration herein, except as set forth in the claims.

In the drawings,

FIGURE 5 is a perspective view of one cutting disk and its supporting structure;

FIGURE 6 is an enlarged side view of the top support; and

FIGURE 7 is an enlarged side view of a single flinger.

Figure 1:
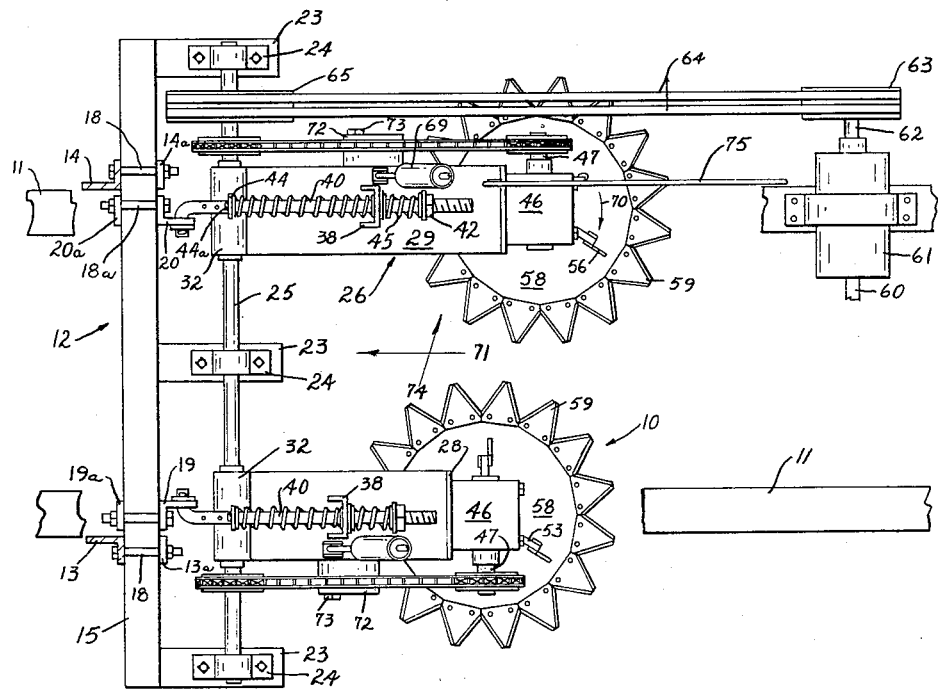
FIGURE 1 is a top plan view of my invention showing the supporting frame structure partly broken away for clarity.
Figure 3:
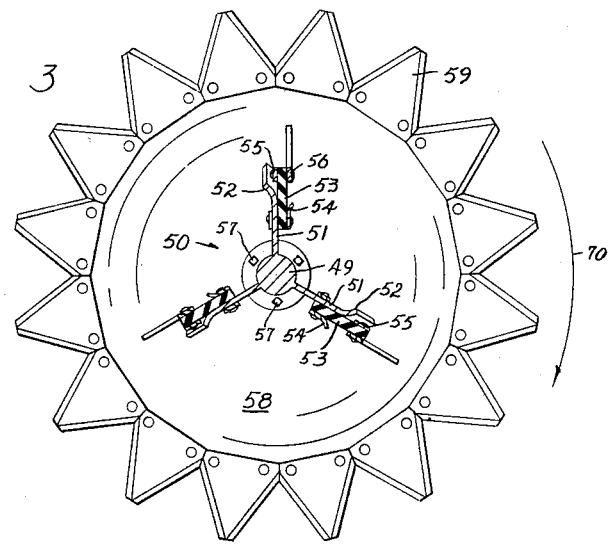
FIGURE 3 is an enlarged sectional view taken along line 3—3 in FIGURE 2 and showing one of the cutting disks.

Referring now to the drawings the sugar beet topper as a whole is designated 10. It is adapted to be attached to a horizontal frame member 11 mounted on each side of the mobile unit. The topper has a mounting bracket 12 consisting of two uprights 13, 14 plus a tubular cross-bar 15. The uprights 13, 14 are provided with three mounting holes 16 into one of which is inserted a bolt 17 to pivotally mount the upright 13 or 14 upon frame member 11. Cross-bar 15 is attached to the uprights 13, 14 by means of long bolts 18 which connect the uprights 13, 14 and brackets 13a, 14a. Each upright 13, 14 has a connection with an adjusting turnbuckle 21, 22 which are connected to frame member 11 forward of the pivot bolt 17.

The cross-bar 15 extends beyond the width of the frame members 11 on each side and has rearwardly extending horizontal bearing supports 23 fixed to its lower surface at its center and at each end. A bearing 24 is mounted upon each support 23. These bearings 24 rotatably support a head shaft 25. The head shaft 25 in turn is the main support element for the cutting assembly.

A top support generally designated as 26 is constructed of welded top element 29, side elements 27 and end elements 28 which make up an open rectangular structure with the open side facing downward. The inner side element 27 has a fixed depending plate 32. The outer side element 27 has a depending side extension 30 which is provided with an angular surface 31. The forward end of support 26 has fixed thereto a bushing 32 which rotatably mounts the top support 26 upon head shaft 25. A rectangular mounting plate 39 is fixed to angular surface 31.

Figure 2:
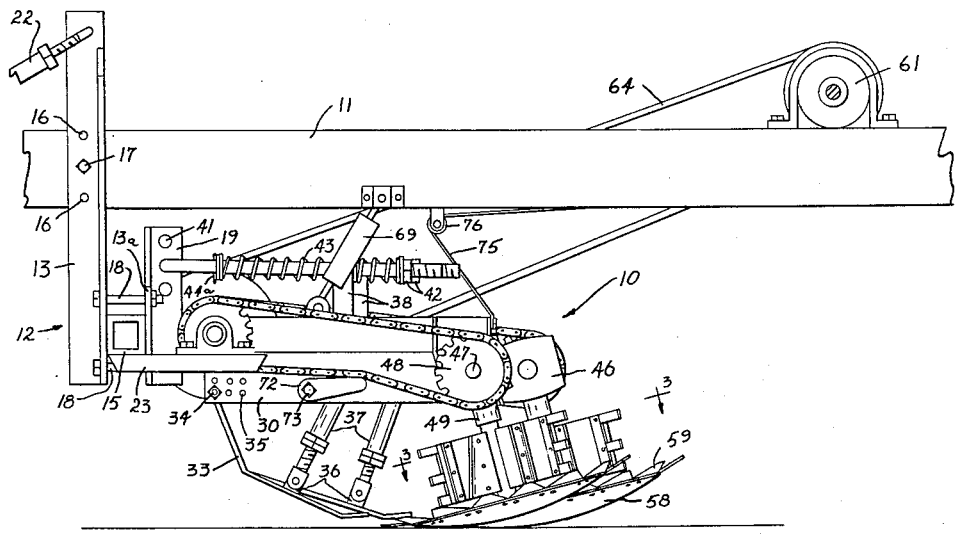
FIGURE 2 is a side elevational view of the device as shown in FIGURE 1 with the frame structure partly broken away.
Figure 4:
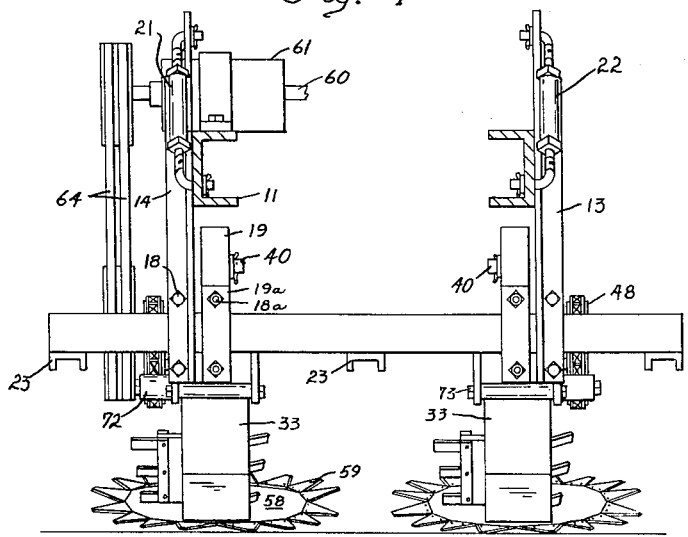
FIGURE 4 is a front view of the invention shown in FIGURE 1 with the frame structure only partly illustrated for clarity.

A topper shoe 33 hangs from each top support 26 and is pivoted to plate 32 and extension 30 by means of a bolt 34 passing through one of several holes 35 on these members. The shoe 33 has an angular configuration as shown in FIGURE 2 and has an upwardly extending ear 36 which serves as a pivot connection for turnbuckle 37 which is connected between ear 36 and a similar ear mounted on the lower surface of top element 29 in top support 26. Fixed to the upper surface of top element 29 is a brace 38 which is provided with an opening to receive the counterbalance shaft 40. The shaft 40 has one end bent so it may be extended through one of several holes 41 in stabilizer bar 19 or 20 which are attached to cross-bar 15 by means of bolts 18a and braces 19a, 20a. The shaft 40 is threaded at the opposite end and has a nut 42 engaged upon it. Spring 43 is mounted upon shaft 40 as a compression spring between washer 44 and brace 38. Spring 45 is mounted upon shaft 40 between brace 38 and nut 42 and also is a compression spring. Spring 43 may be adjusted by varying the position of washer 44, while spring 45 may be adjusted by means of nut 42. The cotter pin 44a is used to hold the washer 44 against the spring.

A gear box 46 is located upon mounting plate 39. This gear box 46 is of usual construction and has an input shaft 47 upon which is mounted a chain sprocket 48. At right angles to shaft 47 and extending downwardly, is the output shaft 49. The inner construction of gear box 46 is not vital to this invention and therefore no further explanation will be given since such gear boxes are well known. Mounted upon output shaft 49 for rotation with it is a flinger mount 50. This mount has a plurality of radial sections 51 terminating in a curved edge shown at 52. Edges 52 curve in a direction opposite to the direction of rotation of shaft 49. Fixed to each section 51 is a flexible flinger 53 mounted by means of curved straps 54. The outer end of flexible flinger 53 is secured between a flat strap 55 and a flinger strap with fingers 56. Flinger 53 may be constructed of neoprene or any other desired flexible material.

A cutting disk 58 is mounted by bolts 57 to the bottom of flinger mount 50. The disk is slightly concave at its upper surface and has circumferentially mounted upon it a series of two-bladed triangular cutting elements 59. It can thus be seen that cutting disk 58 and the flingers 53 rotate in unison together with shaft 49.

The drive means can easily be seen in FIGURES 1 and 2. A power take-off shaft 60 from the mobile unit drives through a gear box 61 to an output shaft 62 and a pulley 63. The pulley 63 drives belts 64 which in turn drive a second pulley 65 fixed to head shaft 25. Two chain sprockets 66, 67 fixed to head shaft 25 drive chains 68 which in turn drive chain sprockets 48.

Each top support 26 has a shock absorber 69 mounted between its top element 29 and frame 11 as shown in FIGURE 2. This lessens sudden jarring of the mechanism due to uneven terrain or any sudden drop by shoes 33.

The two top supports 26 are of unequal length, one being slightly longer than the other. This is the only difference between the two structures shown and therefore repetitious description of identical parts has been omitted throughout the previous description. The disks 58 turn in the direction shown by arrows 70 in FIGURE 1. Arrow 71 shows the unit's direction of travel. The chains 68 are held tight by wooden blocks 72 mounted upon side extensions 30 by bolts 73. The chains are used to time the disks, since the flingers 53 of each unit must be in the same angular position at all times for proper operation.

Any number of topper units may be used, depending upon the number of rows to be cut at each pass. If additional disks are to be used, each must be set slightly ahead of the one on its right (in the direction of arrow 71 in FIGURE 1) and all must be identically timed.

In order to allow for traveling between jobs, a cable 75 is provided with a connection to left hand top support 26 as seen in FIGURE 2. Cable 75 passes through pulley 76 mounted upon frame 11 and is activated by an operator to lift the entire assembly.

The operation of the attachment is as follows. As the mobile unit rides down the rows of beets in the direction shown by arrow 71 in FIGURE 1, the shafts 49 are rotated in unison. Shoes 33 are adjusted by means of turnbuckles 37 so as to be locked approximately 2½ inches above the ground. The rear ends of the shoes are set 2 inches from the disks 58. The shoes 33 ride along the beet row to guide the height of cutting disk 58. As the tops are cut by disk 58, they ride upon the disk due to the concave configuration and are thrown in the direction of arrow 74 in FIGURE 1. This direction is determined by the angle of the mounting plate 39, which determines the tilt of disks 58. It can be seen that the stalks will be passed from one disk to the next, which is located slightly rearward, and finally will be deposited at the side of the mobile unit out of the way of the beet picker.

Springs 43, 45 are adjusted so as to counterbalance the assembly. Spring 43 tends to push the disks downward, but spring 45 lifts them in opposition to spring 43. By turning nut 42, the turning moment about shaft 25 may be overcome to allow the mechanism to "float." The shock absorber 69 prevents any sudden change of height when an obstacle is met by shoes 33.

Further modifications will suggest themselves to one skilled in this art in view of this disclosure and therefore the scope of this application is not intended to be limited except by the claims.

Having thus described my invention, I claim:

1. A sugar beet topper adapted to be carried by a supporting frame structure comprising a plurality of laterally spaced support assemblies pivotally mounted on the supporting frame structure for pivotal motion in vertical planes, a cutting disk assembly individually mounted on each of said supporting frame structures and depending downwardly therefrom, said cutting disk assemblies being mounted for rotation about their respective longitudinal axes, timed drive means operatively connected to each of said cutting disk assemblies adapted to rotate said cutting disk assemblies about their respective longitudinal axes, in timed relation to one another, radial flinging means mounted on each cutting disk assembly for rotation therewith, each of said cutting disk assemblies being forwardly offset from the transversely adjacent cutting disk in the direction of motion of the forward portion of said cutting disk assemblies in such relation that tops thrown by one flinging means will be carried by successive flinging means to the side of the topper.

2. The device as defined in claim 1 wherein each cutting disk assembly comprises a rotatable shaft extending downwardly and rearwardly from said respective support assembly at an angle to the vertical, a concave disk fixed at its center to the lower end of said shaft with the concave face of the disk abutting said shaft, and a plurality of triangular cutting elements fixed to said disk about the disk periphery and extending tangentially to the curvature of the disk periphery.

References Cited in the file of this patent

UNITED STATES PATENTS

| | | |
|---|---|---|
| 1,951,444 | Sands | Mar. 20, 1934 |
| 2,528,886 | Jones et al. | Nov. 7, 1950 |
| 2,629,979 | Diethelm | Mar. 3, 1953 |
| 2,755,614 | Sishc | July 24, 1956 |